3,533,208
SPRAYABLE WAX ADHESIVE AND METHOD
OF MAKING SAME
Joseph R. Fields, 4565 Artley, Belleville, Mich. 48111
No Drawing. Continuation-in-part of application Ser. No. 505,726, Oct. 29, 1965. This application Feb. 27, 1967, Ser. No. 618,993
Int. Cl. B65b 63/08, 3/04; C08b 9/06
U.S. Cl. 53—25                    1 Claim

ABSTRACT OF THE DISCLOSURE

A sprayable wax adhesive composition and method of preparing the adhesive is disclosed. The composition comprises a stable mixture of a synthetic amorphous hydrocarbon wax having high adhesive properties in a carrier liquid. Preferably, a propellant material is also provided in the mixture for spraying of the mixture from the closed container in the manner of an aerosol. The carrier is selected of a material which will not dissolve the wax, which will vaporize at relatively low temperatures, approximating room temperature, and which will not stain or discolor an absorbent surface, such as paper or cardboard. The mixture is preferably formulated by dissolving a wax and carrier in a closed container upon application of heat. After the wax has been dispersed throughout the carrier, the mixture is allowed to cool, whereupon wax particles having some of the carrier mixture dissolved therein, will precipitate out as globules and form the desired mixture.

CROSS-REFERENCE TO RELATED APPLICATIONS

This application is a continuation-in-part of my application Ser. No. 505,726, filed Oct. 29, 1965, now abandoned, which was in turn a continuation of my application Ser. No. 229,011, filed Oct. 8, 1962, now abandoned.

BACKGROUND OF THE INVENTION

This invention relates, specifically, to spray adhesives, and more particularly, to a pressure-sensitive type sprayable wax adhesive composition and a unique method for preparing such an adhesive.

The present invention is specifically directed to the preparation of a pressure-sensitive wax adhesive composition which is particularly well adapted for, but not limited in use to, the preparation of photocompositions, i.e., a full sized or scaled layout to be photographed consisting of a paper or cardboard substrate on which copy, consisting of various mechanical elements, has been artistically assembled and adhered in place by a suitable adhesive, i.e., an adhesive that can be readily applied with facility to any material, any size, any shape, any thickness, in any position, and will not penetrate the surface upon which it is applied whereupon irreparable damage might result to costly artistic or mechanically reproduced elements as the result of such penetration. By being termed "suitable" such an adhesive should have the ability to permit the pre-location of adhesive coated mechanical elements thereby permitting tenative layout desires to be explored whereupon the various adhesive coated mechanical elements do not effect a permanent adhesion to the substrate surface during this "tenative" phase and may be shifted to any position at any time without harm to either the element or the substrate. The term "suitable" also applies to an adhesive that will permit changes to be made at any time after effecting a permanent adhesion, i.e., any or all of various mechanical elements that have been permanently adhered to a substrate may be easily removed by peeling from the substrate surface without damage to either the element or the substrate surface, and relocated and re-adhered without the necessity of recoating the element with additional adhesive. A suitable adhesive should not, with age, discolor the element to which it is applied, nor should it become disengaged from the substrate, either in use or in storage, under normal conditions. Wax is, as such, a "suitable" adhesive and has been accepted and widely used by the Graphic Arts Industry, but is by no means restricted to this area.

Several waxes for this particular purpose are commercially available, and in substantially all cases, the particular wax comes in a solid form similar in overall appearance to a block of paraffin. The adhesive properties of such waxes are ideal for their intended purpose, however in many instances difficulties are encountered in applying the wax adhesive to the mechanical elements or substrates because of the fact that the wax adhesive is applied by melting the wax, thereby creating the undesirable condition of the hot, molten wax penetrating the porous surface of an element and staining or completely destroying its usefulness for photographic purposes. The wax in a melted state is applied in a continuous film of predetermined thickness, and as is often the case, when mechanical elements are adhered to a substrate and adhesion is made permanent by burnishing, some of the wax adhesive is forced out around the edges of the element and this "ooze" must be cleaned off the substrate. Another contributing cause to this "ooze" is the fact that when the molten wax is applied to the surface of the element the surface is sealed against any further absorption of the wax.

Special applicators have been devised for applying a relatively thin coating of such melted wax to the surface of mechanical elements or substrates, such as a piece of paper, but such applicators suffer the drawback of being limited in the type of material, size, shape, thickness, and versatility of various position (horizontal, vertical, etc.) applications. These machines are electrically operated. In this example the wax adhesive must be melted before use and the equipment must remain on during the entire period of anticipated usage to maintain the wax in a melted state for application. Being intricate, precision-made, thermostatically controlled equipment, some are rather expensive, and require a normal amount of maintenance to prevent expensive repairs or breakdowns. Due to their inability to function without an external source of energy, they are not portable, i.e., they cannot be used anywhere except at or near an electrical power source.

Accordingly, it is an object of the present invention to provide a pressure-sensitive adhesive wax composition which can be instantly and readily applied, as by spraying, at ordinary room temperatures to a substrate of any type of material, size, shape, thickness or in any position.

It is another object of the invention to provide an adhesive wax composition which can be readily applied, as by spraying, at ordinary room temperatures to a substrate in globule form which substrate when placed in proximity with a source of heat, such as an infrared lamp, will melt into a continuous film of wax. This process will find use in applying a waterproof, moistureproof, vaporproof, and self-sealing coating to, but not limited to, substrates such as paper. Such paper wrappings are now widely used in packaging printing papers, as one example.

It is another object of the invention to provide an adhesive wax composition which can be readily applied, as by spraying, at ordinary room temperatures to, but not limited to, nickel alloys which when die-stamped and then annealed require a protective coating against water as well as the additional lubricant in the forming. When the nickel alloy is annealed, the adhesive wax composition has a reducing action on the oxides, giving a very bright anneal.

It is another object of the invention to provide an adhesive wax composition which can be readily applied, as by spraying, at ordinary room temperatures to substrates as a "stop-off" wax for differential plating.

It is another object of the invention to provide an adhesive wax composition which can be readily applied, as by spraying at ordinary room temperatures to, but not limited to, zinc, copper, or aluminum, as a resist in the etching processes.

It is another object of the invention to provide an adhesive wax composition which can be readily applied, as by spraying at ordinary room temperatures, to the working faces of dies and molds to facilitate the parting of cast or injection molded objects.

It is another object of the invention to provide a method for preparing a wax composition having the properties set forth in the foregoing objects.

Another object of the invention is to provide a sprayable, pressure-sensitive wax adhesive of relatively stable composition having adequate shelf life when stored in a sealed container.

A sprayable pressure-sensitive adhesive wax composition according to the present invention may be prepared from starting materials which include waxes such as those sold under the trade names, Flexo Wax C or Flexo Wax C Light by Glyco Chemicals, Inc., 417 Fifth Ave., New York, N.Y. These particular waxes are widely used and known in the Graphic Arts Industry and are synthetic, non-crystalline, hydrocarbon waxes possessing high adhesive properties.

Flexo Wax C will melt at 66°–74° C. and will cold flow at 63°–65° C. although in thin layers on paper and cloth it will not flow at much higher temperatures. Flexo Wax C Light is a lighter colored wax and is slightly softer and tackier than Flexo Wax C and has a slightly lower melting point (60°–64° C.). These waxes are described in bulletins W–100 and W–103 of Glyco Chemicals.

The two waxes described above are now being widely used in the Graphic Arts Industry in the manner previously described—i.e., by cutting large blocks of wax into smaller chunks and melting the wax in electrically heated equipment which is then applied in a hot molten state to a substrate by feeding the substrate into a precision roller mechanism installed for this purpose on the equipment. The present invention seeks to take advantage of the desirable properties of these waxes and, in one sense, the present invention may be said to be directed to converting or preparing the particular waxes into suitable compositions for spray applications.

A suitable form for spray application of a wax adhesive on a substrate, such as bond paper, must be one in which the adhesive wax globule contains only enough solvent to permit expulsion from the spraying apparatus and during its travel to the substrate surface loses the greatest portion of this solvent through evaporation thereby landing upon the substrate surface in a relatively dry state resulting in the shortest drying time possible so as not to delay the adhering of adhesive coated items to a layout. Another important factor in this rapid phase out of solvent in the wax composition is the minimizing of the possibility of solvent penetration of the substrate—of particular importance when applying adhesive coatings to delicate carbon ribbon compositions, which comprise the bulk of text copy composition in the preparation of manuals, books, etc. in the offset printing industry.

The rapid phase out of solvent in the wax globule becomes an even more important feature when applying an adhesive wax coating to a non-porous surface such as glass, or metal where the solvent flash off is from one surface only. Waxes are traditionally well known for their trapping and retardation of solvent evaporation—a feature which adapts some species of wax so ideally to being formulated into efficient paint removers.

Considerable research was expended in determining the ideal solvent for the wax adhesive composition in the present invention. Ideally a solvent was desired that was in essence a propellant such as Freon 12, etc., but stable at room temperature, and not under pressure. Such a solvent had to be highly volatile, and preferably non-flammable and compatible with the wax and propellant. Such a solvent proved to be methylene chloride ($CH_2CL_2$). It is imperative that the solvent used in this invention contain no petroleum derivatives or blends as any traces of petroleum solvents will result in undesirable staining and discoloration of substrates and retard the drying process of the composition. There are other chlorinated, hydrocarbon solvents that could be used such as 1,1,1-trichloroethane, however, methylene chloride was chosen as the safest of all suitable solvents because it is among the least toxic of all chlorinated solvents and has little capacity to produce serious organic injury.

It should be emphasized that the wax used in this invention is less than 4% soluble in the carrier, methylene chloride, at room temperature (based on —4 gr. wax in 100 gr. methylene chloride). Therefore in order to effect a complete dissolution for the wax in the carrier it was essential that the carrier's temperature be elevated, preferably in a closed container sufficient to withstand the pressure of the vaporized carrier when the temperature was elevated to the rate necessary to melt the wax. The boiling point of the carrier, methylene chloride, is 38.3° C. (100.9° F.) and the melting point of Flexo Wax C Light (for example) is 60°–64° C. (140°–145° F.). Therefore, in order to completely melt the wax, whose melting point is higher than the carrier's, the closed container is essential. Methylene chloride is similar to water in respect to boiling point temperatures—i.e., water will boil at 100 C. (212° F.) and the temperature will not increase above this point, and if the water continues to boil at this temperature it evaporates in the form of steam. Methylene chloride reacts to heat in exactly the same fashion—i.e., once the boiling point of 38.3° C. is reached, then the temperature will not increase but instead vaporization will occur. However, the heat of this vaporization (at boiling point) in B.t.u.'s/lb. is 141.7, while the Specific Heat of the solvent B.t.u.'s/lb. at $+100°$ F. is 0.277. So it can be assumed from this comparison that the closed container offers the ideal climate for the vaporized methylene chloride to efficiently and effectively dissolve the wax with a minimum of temperature increase and solvent loss.

When the wax has melted within the closed container and combined with the methylene chloride, the application of heat can be terminated and the composition allowed to cool to room temperature. During this cooling phase, the pressure created within the closed container during the heating phase will decrease, and upon reaching room temperature, the vaporized methylene chloride will have distilled back into solution thereby forming a stable composition devoid of pressure in which the wax will have precipitated out of solution in a dispersion of very fine minute globules each of which contains approximately a 4% solution of methylene chloride with the balance of the solvent in the composition acting as an insulating buffer that prevents the agglomerating of the minute particles of wax in dispersion.

At this stage, the composition is at its peak of quality, and any further exposure to the air, due to the high volatility of the carrier, causes a gradual degradation of the quality of the wax composition. Therefore, it is essential that all handling and transferral be accomplished as rapidly as possible, and all containers intended for storage be equipped with leak-proof locking covers. It should be noted that any solvent allowed to escape from the composition will impair the quality of the wax composition when it is aerosoled. There is an optimum formula for this wax composition, and if it is too dry (solvent loss) it may tend to cause undue clogging of the aerosol sprayhead, and if it is too wet (excess of solvent) it may tend to cause solvent penetration of porous substrates.

To minimize the handling of the wax composition wherein the uncontrollable loss of solvent carrier is difficult to evade, the following alternate method has been adapted, which method gives the best guarantee of quality control of each aerosol:

(a) Wax is melted in a heated container and measured into an empty aerosol container.

(b) Immediately following introduction of melted wax into container, container opening is sealed by inserting aerosol valve and crimping closed thereby sealing hot melted wax inside aerosol can.

(c) Measured quantity of methylene chloride is introduced, under pressure, into hot container causing hot wax to foam inside container.

(d) Measured quantity of propellant (Freon 12, etc.) is introduced, under pressure, into container now containing partially dissolved wax and methylene chloride.

(e) Aerosol containing above ingredients is immersed in hot water tank with a temperature of approximately 140° F. for a predetermined length of time.

(f) Entire contents, now under pressure, within container melt into a clean liquid wax composition.

(g) Sealed can is removed from hot water tank and allowed to cool to room temperature whereupon wax precipitates and becomes a sprayable pressure-sensitive wax adhesive.

The foregoing process results in a composition which is stable and which may be stored in closed containers for substantial periods of time.

The composition prepared according to the foregoing process may conveniently be packaged in various sized metal (other than aluminum) containers with leak-proof lock-on type covers and distributed in bulk form for use in pneumatic spray type equipment.

The foregoing example is but one examplary embodiment of the invention. A mixture of equal parts of paraffin and beeswax makes a pressure-sensitive adhesive wax adaptable to the present invention.

While I have described an embodiment of my invention, it will be apparent to those skilled in the art that the foregoing embodiment may be modified. Therefore, the foregoing description is to be considered exemplary rather than limiting, and the true scope of the invention is that defined in the following claims.

I claim:
1. The process for making a sprayable wax adhesive composition in a closed container, said composition comprising a stable mixture having a continuous phase including a highly volatile liquid hydrocarbon carrier having a vaporizing point near room temperature and which will substantially volatize upon being sprayed into the ambient atmosphere and which is free from substantially any petroleum derivatives or blends of petroleum solvents, and a discontinuous phase comprising globules of a synthetic amorphous hydrocarbon wax with high adhesive properties, said wax being only slightly soluble in said carrier at room temperature whereby the continuous and discontinuous phases are maintained separate, comprising placing the wax and carrier into a container at room tempearture, sealing the container, providing the container and seal therefor of sufficient strength to withstand generated vapor pressure of approximately twenty-five p.s.i., then heating the container and its contents to a temperature sufficient to melt the wax whereupon the wax will disperse into the carrier, then cooling the container and its contents to room temperature whereupon the wax will precipitate and form small globules of a size of 3 mil diameter or less which are capable of being expelled under pressure from a metered orifice.

References Cited

UNITED STATES PATENTS

| | | | |
|---|---|---|---|
| 2,953,284 | 12/1957 | Prussin et al. | 106—271 |
| 3,073,706 | 1/1963 | Treboux | 106—271 |
| 3,202,523 | 8/1965 | Steeg | 106—271 |
| 3,241,993 | 3/1966 | Sesso | 106—271 |
| 3,313,636 | 4/1967 | Blair | 106—271 |
| 3,395,028 | 7/1968 | Mackles | 106—271 |
| 3,423,225 | 1/1969 | Coney et al. | 106—271 |

MORRIS LIEBMAN, Primary Examiner

S. L. FOX, Assistant Examiner

U.S. Cl. X.R.

53—36; 106—271; 141—3